US012558199B2

(12) United States Patent

Creech

(10) Patent No.: US 12,558,199 B2

(45) Date of Patent: Feb. 24, 2026

(54) SYSTEMS AND METHODS OF DENTURE DUPLICATION

(71) Applicant: Michael A. Creech, Angier, NC (US)

(72) Inventor: Michael A. Creech, Angier, NC (US)

( * ) Notice: Subject to any disclaimer, the term of this patent is extended or adjusted under 35 U.S.C. 154(b) by 0 days.

(21) Appl. No.: 17/405,288

(22) Filed: Aug. 18, 2021

(65) Prior Publication Data

US 2023/0027641 A1     Jan. 26, 2023

Related U.S. Application Data

(60) Provisional application No. 63/223,602, filed on Jul. 20, 2021.

(51) Int. Cl.
*A61C 13/00*      (2006.01)

(52) U.S. Cl.
CPC ...... *A61C 13/0004* (2013.01); *A61C 13/0013* (2013.01); *A61C 13/0019* (2013.01)

(58) Field of Classification Search
CPC ............ A61C 13/0004; A61C 13/0013; A61C 13/0019
See application file for complete search history.

(56) References Cited

U.S. PATENT DOCUMENTS 5,711,668 A  *   1/1998   Huestis .............. A61C 13/0003
                                           433/167
6,224,375 B1 *   5/2001   Diasti ................ A61C 13/0003
                                           433/167

6,488,503 B1 *   12/2002   Lichkus ................. A61C 13/20
                                         433/202.1
6,619,959 B2 *   9/2003   Iiyama ............... A61C 13/0004
                                         433/215
6,648,640 B2 *   11/2003   Rubbert ................. G16H 50/50
                                         433/24
6,835,066 B2 *   12/2004   Iiyama ............... A61C 13/0004
                                         433/223
6,970,760 B2 *   11/2005   Wolf ........................ A61C 5/77
                                         700/118
7,153,135 B1 *   12/2006   Thomas ............... A61B 5/1077
                                         433/213
7,236,842 B2 *   6/2007   Kopelman ............. A61C 13/09
                                         700/118
8,195,320 B2 *   6/2012   Garcia-Aparicio ..........................
                                     A61C 13/0018
                                         700/98
9,801,699 B2 *   10/2017   Okay ................... A61C 9/0053
10,646,311 B2 *   5/2020   Watzke ................ A61C 13/082
11,298,210 B2 *   4/2022   Khouri ..................... A61C 7/08

(Continued)

*Primary Examiner* — Nicholas D Lucchesi

(74) *Attorney, Agent, or Firm* — The Rapacke Law Group, P.A.

(57) ABSTRACT

Denture duplicating methods and systems are described that include a controller configured to scan a mold of a denture for a wearer using a scanner, create a denture specifications file associated with the mold of the denture, store the denture specifications file in non-transitory computer readable memory, upon request, retrieve the denture specifications file and load it into a milling design software program to generate a replacement denture platform design, and instruct a communicatively coupled three-dimensional printer to perform a print operation resulting in a replacement denture platform based in part on the replacement denture platform design before the replacement denture platform and milled teeth can then be sent to the wearer.

8 Claims, 8 Drawing Sheets

(56) References Cited

U.S. PATENT DOCUMENTS

| | | | | |
|---|---|---|---|---|
| 2002/0163096 A1* | 11/2002 | Price | A61C 13/04 | 264/16 |
| 2005/0023710 A1* | 2/2005 | Brodkin | A61K 6/818 | 264/16 |
| 2006/0040236 A1* | 2/2006 | Schmitt | A61C 11/00 | 433/213 |
| 2008/0227056 A1* | 9/2008 | Bulard | A61C 1/084 | 433/172 |
| 2009/0042167 A1* | 2/2009 | Van Der Zel | A61C 9/0053 | 433/172 |
| 2009/0075237 A1* | 3/2009 | Garcia-Aparicio | A61C 13/0018 | 433/202.1 |
| 2012/0261848 A1* | 10/2012 | Haraszati | B33Y 80/00 | 264/17 |
| 2013/0022937 A1* | 1/2013 | De Clerck | A61C 13/0018 | 433/44 |
| 2015/0111172 A1* | 4/2015 | Jung | A61C 5/77 | 433/172 |
| 2016/0317261 A1* | 11/2016 | Schnitzspan | A61C 13/082 | |
| 2016/0361139 A1* | 12/2016 | Webber | A61C 13/0004 | |
| 2017/0035536 A1* | 2/2017 | Alvarez Garcia | A61C 9/0053 | |
| 2017/0165032 A1* | 6/2017 | Webber | A61C 7/08 | |
| 2017/0319296 A1* | 11/2017 | Webber | B33Y 80/00 | |
| 2018/0110591 A1* | 4/2018 | Sato | B29C 53/36 | |
| 2018/0263739 A1* | 9/2018 | Simmonds | A61C 8/0001 | |
| 2019/0090995 A1* | 3/2019 | Ruppert | B33Y 30/00 | |
| 2019/0307537 A1* | 10/2019 | Fung | A61C 13/08 | |
| 2019/0343606 A1* | 11/2019 | Wu | A61C 7/146 | |
| 2020/0281702 A1* | 9/2020 | Kopelman | A61C 9/0046 | |
| 2021/0196427 A1* | 7/2021 | Miller | B33Y 10/00 | |
| 2022/0151748 A1* | 5/2022 | Patil | A61C 13/082 | |
| 2022/0160488 A1* | 5/2022 | Arany | A61C 9/0053 | |
| 2022/0287871 A1* | 9/2022 | Naidu | A61C 7/36 | |

* cited by examiner

300 ⟍

304

302

306

400 ⟍

402

500 ⟍

502

600 ⟍

602

700

702

800

602

702

1100

1102

1104

1106

1200

1202

Milling Machine

1204

1205

3D Printer

1206

1208

1210

1212

SYSTEMS AND METHODS OF DENTURE DUPLICATION

CROSS-REFERENCE TO RELATED APPLICATIONS

The present application claims priority to U.S. Provisional Application No. 63/223,602 filed Jul. 20, 2021, titled "DUPLICATE DENTURE ON DEMAND PRODUCT SERVICE FOR GENERAL CONSUMER," which is hereby incorporated by reference in its entirety.

TECHNICAL FIELD

The present disclosure relates to systems and methods for denture duplication, and more particularly to denture duplication systems and methods that increase the convenience, simplicity, speed, and accuracy of duplicating existing dentures when needed, rather than creating new dentures by traditional denture replacement processes.

BACKGROUND

Studies have determined that upwards of forty million Americans are missing all of their teeth. Around ninety percent of this fully toothless population wear or otherwise use dentures as an effective alternative to tooth replacement. A denture is typically understood to be a removable replacement for missing teeth and surrounding tissues and comes in two general types—complete and partial. Dentures are critical for providing the important facets of normal oral function and are used while eating, drinking, and engaging in verbal and non-verbal communication. This normal oral functioning is important in maintaining proper nutrition and, by extension, the denture wearer's overall physical health. Dentures have other important benefits, including effectively restoring and maintaining an edentulous person's desired appearance, thereby boosting their self-esteem and improving their mental health.

Unfortunately, a great number of denture wearers will lose their dentures over the course of their lifetimes. In particular, seniors suffering from Alzheimer's disease and dementia are particularly susceptible to the phenomenon of denture loss because of the nature of their ailments. Even those suffering no specific cognitive impairment may lose their dentures. Frequent causes of denture loss can include, but are certainly not limited to, accidental misplacement, destruction by pets, fire, or other property damage, hospital staff or caregivers inadvertently throwing them away, and even children disposing of them by flushing them down the toilet. Currently, when a denture wearer's denture(s) have been lost, their only option may be to visit a dentist and arrange for the dentist to have a replacement denture fabricated. This process can extend over multiple appointments and may take weeks, or longer, before a replacement denture is obtained. In some cases this lengthy period without such an integral dental apparatus can cause or exacerbate existing malnutrition problems and inflict severe negative self-image issues on the denture wearer. If and when a replacement denture is finally obtained, the replacement denture is rarely, if ever, an exact replica of the original that was lost. As such, the replacement denture may cause discomfort, irritation, and difficulty for the wearer, prolonging their misery and requiring further adjustments or replacements. Furthermore, the price of replacement dentures may be high, if not exorbitant, when purchased from a general dental care provider, compounding the wearer's problems by adding negative financial ramifications to an already tragic situation.

There exists a need for denture patients to have back-up dentures on hand. Most denture wearers do not think about what might happen if their dentures are damaged, destroyed, or lost, and dentists have not historically offered a back-up denture option. It is unlikely that many dentists would successfully offer dental duplication services because pricing concerns would likely be too high to achieve wide patient acceptance. Therefore, duplicate dentures have not been historically advertised or offered. Thus, simple, quick, efficient, cost-effective, and easy denture replacement is clearly desirable.

Various methods of making effective negative molds of objects have been performed and refined, some even dating back to ancient Egypt. Indeed, there are multiple oral appliances on the market today where a person may take impressions to create a negative mold of an object such as teeth and then create an insert for an appliance, e.g. sports mouthguards, occlusal guards, oral sleep apnea devices, teeth bleaching trays, and others. Historically, it was possible to duplicate a denture using analog methods and materials by first manufacturing a duplication mold and then utilizing the mold to fabricate a duplicate denture. "Copy milling" is a relatively recent development and departure from historical denture duplication methods.

Typically, only dental professionals such as dentists and dental laboratories have performed denture duplication. They have employed different duplication devices, which typically capture a negative mold of an existing denture and then use the mold to manufacture a duplicate denture. In the past and through the present, very few dentists have offered duplicate dentures to their patients, although some dentists have done so in order to provide their patients a back-up denture to be used in a time of need. Often, these duplicate dentures are manufactured using inferior materials and have been intended only to "get the patient by" until a permanent replacement denture could be created by the dentist.

Some attempts to provide high quality denture replacements have been developed in the past. One such attempt was created when William Price, DDS (deceased) of Winston Salem, NC founder of Altadonics Corp. recognized the need to provide duplicate dentures to his patients. Dr. Price decided to create a company that sold patented (e.g. U.S. Pat. Nos. 7,040,885 and 6,730,246) denture duplication kits to dentists. Dr. Price's concept was for dentists to buy kits and make duplication molds in their office at the time of new denture delivery. (This differs from the instant embodiments, which include direct to consumer sales of back-up and/or replacement dentures that are identical to existing dentures.) The molds were then sent to Altadonics and placed in storage. If ever needed, Altadonics could contract with a dental laboratory to fabricate an analog duplicate denture using the stored, on-hand denture mold. Once fabricated the denture would be sent to the dentist for patient delivery. Although the concept was sound and fulfilled patients' needs, Altadonics never achieved its desired success in the dental marketplace. It is possible that selfish interests played a part in that dentists were generally unreceptive to implementing this offering to their denture patients because dentists had far more profitability to gain in selling a patient a new denture and potentially having the patient visit their offices for multiple appointments than by providing Altadonics' faster and less expensive alternative.

There is no known product or service that offers denture wearers the ability to have a duplicate or replica denture fabricated or delivered on demand. Specifically, no product or service allows a denture wearer (or their surrogate or agent) to perform self-duplication of an existing denture and shipment directly to a laboratory or manufacturer (dental or otherwise) to fabricate an "exact replica" of the existing denture that can be used as a permanent replacement denture. The invention is novel in that it gives consumer assurance that they will never go without their smile, chewing, or other normal oral functions should they lose their dentures due to any cause. Furthermore, it allows for the denture wearer to maintain or otherwise have an identical smile for life. Replacement dentures and related systems and methods in this fashion are currently not offered in conventional denture replacement.

Additional advantages that may become apparent based on the embodiments described herein include, but are not limited to:

Consumer (including the denture wearing public) education and raised awareness of a "duplicate denture on demand" service that informs them about the possibility and probability of denture loss over the consumer's lifetime including the potential negative effects of being without their dentures, costs, and related information. Currently and historically, dental service providers have not typically educated denture wearing patients of such occurrences or protective offerings.

Providing an exact replica denture to a denture wearer in their most dire time of need by using permanent, long-lasting denture materials that have been fabricated using a three-dimensional primer and milled, as opposed to the inferior materials used in the past for back-up dentures which were rarely even offered.

Denture wearers will no longer have to leave their home to have their dentures duplicated or give up their existing dentures for any reason. Unlike the existing alternative of scheduling and attending multiple drawn out visits to a dental provider for replacement dentures that are not identical to an existing denture that has been lost, damaged or destroyed, or similar existing lab offerings that require a denture wearer's denture to be mailed to a laboratory for processing using inferior duplication techniques to those described herein.

Cost savings, in that denture wearers will spend a fraction of the cost (over time) that can he incurred with a new denture purchase and manufacture, as with existing techniques.

Denture wearers are spared the suffering of self-esteem issues and even physical health decline related to tooth and denture loss.

Denture wearers have greater control over how and when their dentures will be replaced than currently and in the past.

Denture wearers can maintain their "exact smile" over their lifetime with the novel approach described in these embodiments.

For the foregoing reasons, there is a need for denture duplication systems and methods for replacing dentures on-demand.

SUMMARY

One objective of the embodiments described herein is to provide systems and methods to protect denture wearers from the hardship of being without the denture(s) they are highly dependent upon. Some of these systems and methods allow denture wearers to order in-home denture duplication kits that may be used to create a negative mold of their dentures. Pertinent parts of these in-home denture duplication kits may then be mailed or otherwise delivered to a dental laboratory where analog, digital, or combinations of analog and digital methods may be utilized to capture and make an exact replica of a person's existing denture when needed or otherwise requested. Analog denture molds, along with one or more digitally stored files, such as STL files, are archived and readily available for use with stereolithography CAD (computer aided design) programs in a time of need. In some embodiments, denture wearers may pay a start-up or initiation fee along with a small monthly fee for archival storage. If needed, subscribed members may notify the dental laboratory and a duplicate denture may be fabricated and sent to the denture wearer within a specific amount of time, e.g. 48 hours from notification. Some embodiments include utilizing "copy mill technology," which allows the laboratory to deliver an exact replica that precisely matches the feel and function of their former denture. In summary, the embodiments described herein can provide denture wearers with quicker, more comfortable, and more cost effective methods and systems by which they can replace a lost denture with a duplicate denture than conventional denture replacement methods and systems employed by dental providers.

In various embodiments, systems and methods for denture duplication are provided. In many instances, the denture wearing community may first be educated about the possibility and probability of denture loss over the lifetime of the individual denture wearer, including various increased risk factors any particular individual may have, and the negative impact this can have on the individual's overall wellbeing. As such, denture wearers can be well informed and advised about the benefits of having a duplicate denture that is an exact replica of their existing denture deliverable within a short time period, such as a few days or even faster. This allows denture wearers and their surrogates, family, and other caretakers to take a proactive approach to protect against the harmful and negative effects of denture loss.

The embodiments described herein can include various combinations of existing and later developed analog duplication mold technology, computer aided design/computer aided manufacturing (CAD/CAM), copy-milling design software (e.g. those developed by 3Shape company of Copenhagen, Denmark and others), and three dimensional (3D) printing and milling materials for high quality duplicate denture fabrication.

The various embodiments described herein can provide a proactive step to the protection of housing an archivable mold of consumers existing denture in order to have a duplicate denture fabricated in time of need; to provide a denture mold to dental laboratory in order to have a spare denture fabricated and sent to consumer without the costs and inconvenience related to that of visiting a dental provider; and for nursing homes, assisted living facilities, care givers, children of parents with aging mental illnesses to utilize to ensure that persons of interest are not without their dentures due to loss or damage.

The configuration of the devices described herein in detail are only example embodiments and should not be considered limiting. Other systems, devices, methods, features, and advantages will be or will become apparent to one with skill in the art upon examination of the following figures and detailed description. It is intended that all such systems, devices, methods, features, and advantages be included within this description, be within the scope of the subject matter described herein, and be protected by the accompanying claims. In no way should the features of the example embodiments be construed as limiting the appended claims, absent express recitation of those features in the claims.

Additional features and advantages of the embodiments disclosed herein will be set forth in the detailed description that follows, and in part will be dear to those skilled in the art from that description or recognized by practicing the embodiments described herein, including the detailed description which follows, the claims, as well as the appended drawings.

Both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof. Moreover, all illustrations are intended to convey concepts, where relative sizes, shapes, and other detailed attributes may be illustrated schematically rather than literally or precisely.

BRIEF DESCRIPTION OF THE DRAWINGS

The features and advantages of the present disclosure will be more fully described in, or rendered obvious by the following detailed description of the preferred embodiments, which are to be considered together with the accompanying drawings wherein like numbers refer to like parts and further, wherein.

DETAILED DESCRIPTION

Figure 1:
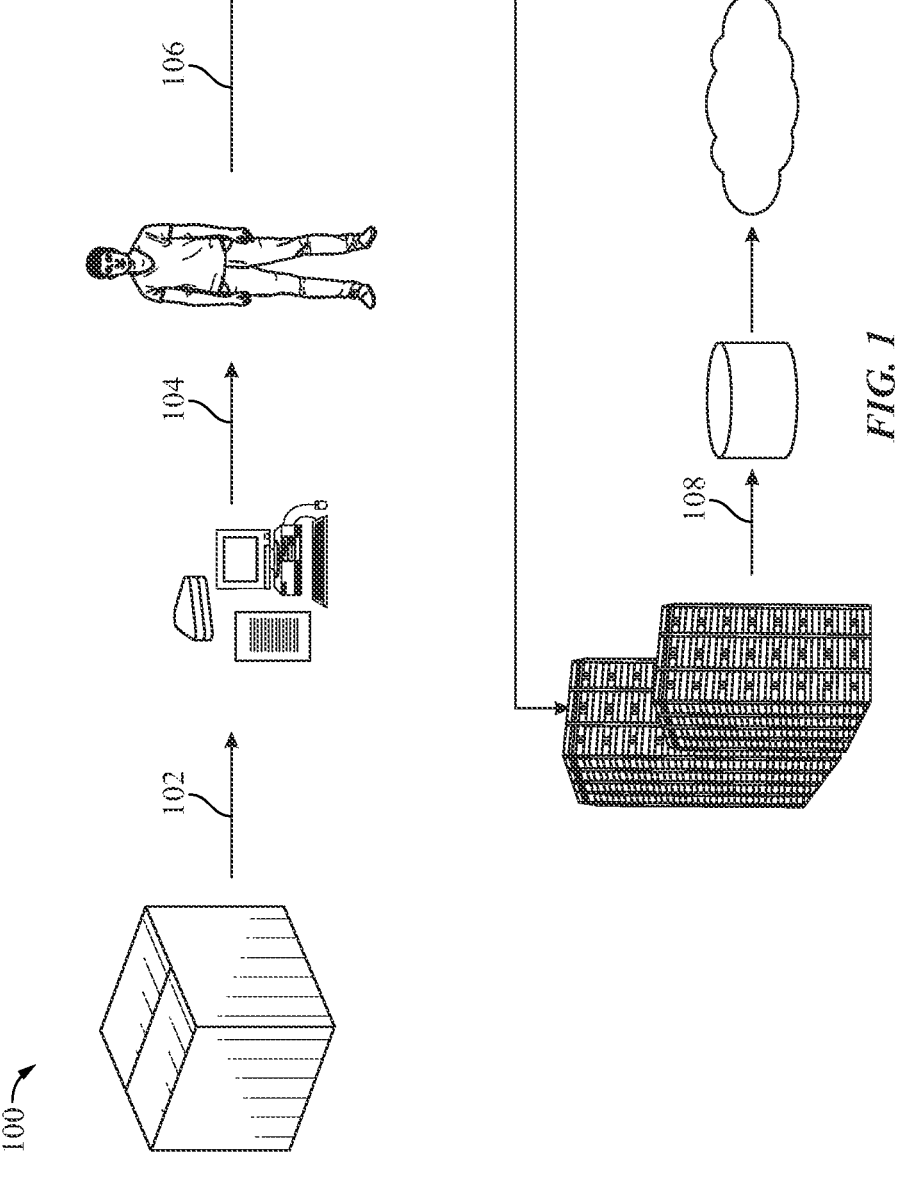
FIG. 1 shows an overview flowchart, in accordance with some embodiments described herein.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

Reference will now be made in detail to the present preferred embodiment(s), and examples of which is/are illustrated in the accompanying drawings. Whenever possible, the same reference numerals will be used throughout the drawings to refer to the same or like parts.

FIG. 1 shows an example embodiment overview flowchart 100. As shown in overview flowchart 100, in some embodiments an initial step 102 in various denture duplication methods and systems can include a person or entity receiving a denture duplication kit, box, or package (referred to interchangeably herein). Persons or entities can include denture wearers, their family members, caretakers, surrogates, agents, dental professionals or others that are associated with a denture wearer and may be assisting them with procuring denture duplication services and items. Denture duplication kits can include apparatuses as described in more detail elsewhere herein, and can also include instruction manuals and/or other literature, scannable or other links to network (e.g. the Internet) accessible content such as videos, and other items and paraphernalia as may be necessary or desired by the service offerer. As should be understood by those in the art, step 102 can occur through various means, such as by postal or delivery service delivery by hand, drone dropoff, pickup at a designated postal box or locker, pickup at a store or meeting point, or any other typical means of receiving and coming into possession of a package. In a subsequent step 104, a denture wearer (or any individual or entity acting on their behalf, as may be the case in many steps in the embodiments herein, as would be understood by those in the art and which not be constantly repeated to save space) can review the material included in the denture kit and create a mold of an existing denture as described elsewhere herein. Next, in step 106 the denture wearer can prepare and deliver a completed kit, including the mold they have created of their existing denture, to a laboratory, office, storage facility, or other appropriate delivery location as designated by the entity offering the denture duplication service. In step 108, Once received, the laboratory or other appropriate delivery location can perform any internal processes it uses to house the duplicate denture mold created using the existing denture. In some embodiments this storage can be local, while in other embodiments it may be transported to a secure, off-site location. Also in addition to step 108, further substeps can be taken whereby the duplicate denture mold is used to create a duplicate denture that can, among other things, be scanned and used to create a digital file that includes the specifications of the existing denture for use in fabricating duplicate dentures. Such substeps are further described in FIGS. 9-12.

Figure 2:
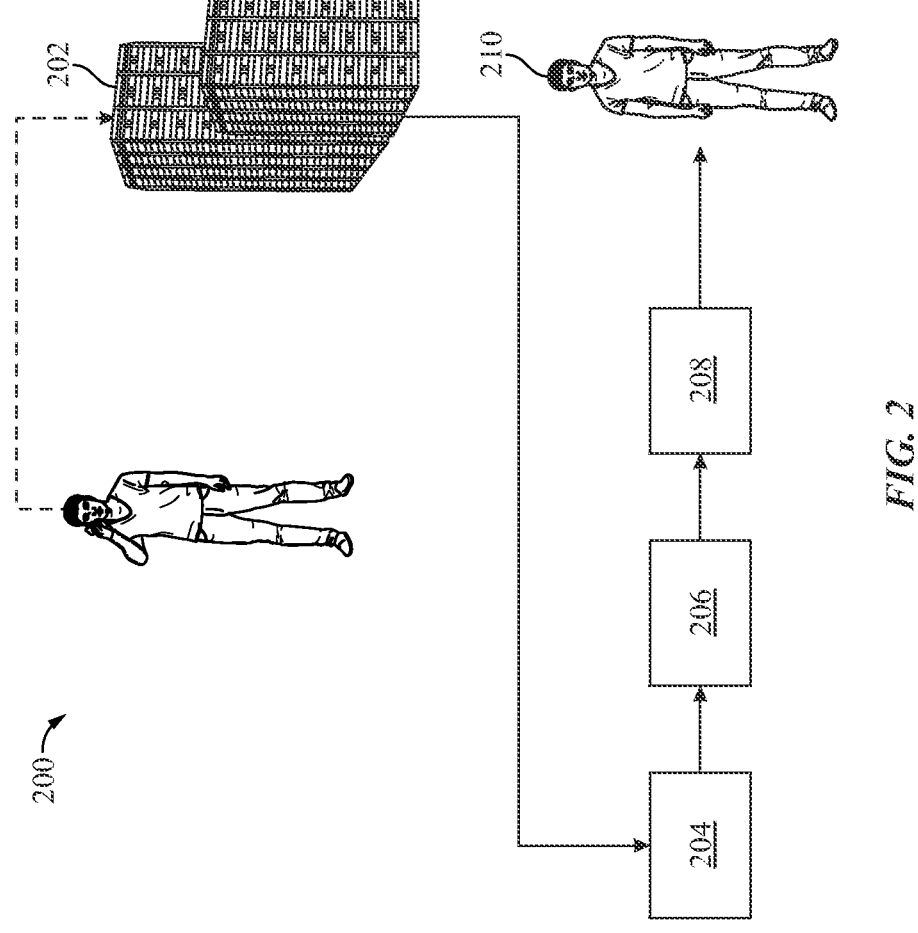
FIG. 2 is a diagram of a service provider process that can occur after a mold has been created, when a consumer contacts the service provider to fabricate a duplicate denture, in accordance with some embodiments described herein.

FIG. 2 shows an example embodiment diagram 200 of a service provider process that can occur after a mold has been created, when a consumer contacts the service provider to fabricate a duplicate denture. As shown in the example embodiment, a denture wearer consumer may contact the service provider (who the previously signed up with and who has previously received the consumer's mold) in their time of need (e.g. when an original, existing denture has been damaged, destroyed, or lost) in step 202. Next, the laboratory can retrieve an archived STL file in step 204. In step 206, the laboratory can prepare a CM) design for printing and milling using the retrieved STL file. The laboratory can then print a replica or replacement denture platform or base, mill replica or replacement teeth, and affix the platform and teeth in step 208. Finally, a quality control check may occur and the replacement denture can be delivered to or otherwise given to the consumer for use.

Figure 3:
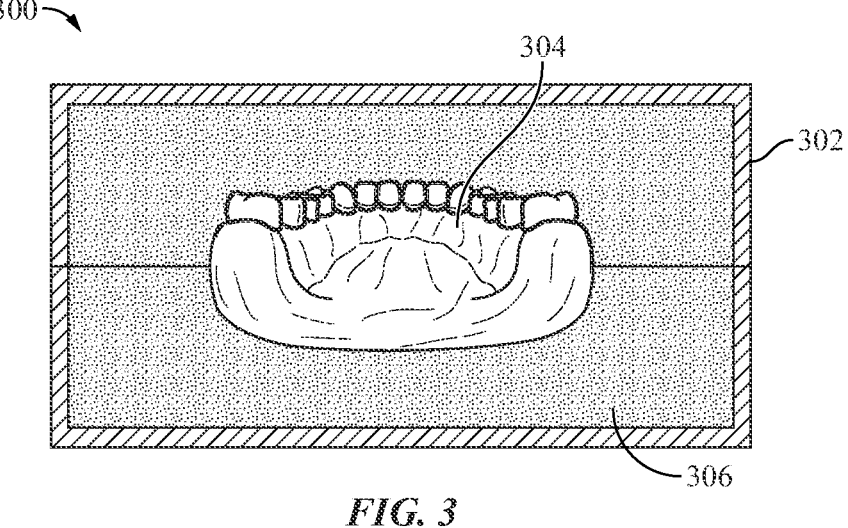
FIG. 3 shows a diagram of a denture molding kit, in accordance with some embodiments described herein.

FIG. 3 shows an example embodiment diagram 300 of a denture molding kit. Contents of a denture molding kit can include, but are not limited to, complete written instructions along with illustrations showing steps needed to successfully complete a denture molding process; a link or web address and accessing credentials for an online video showing steps needed to successfully complete the denture mold process; an information card to be completed by the consumer; a colored shade guide to indicate desired color/shade of denture tooth and denture base; a clear plastic denture flask; materials used in duplication, i.e. modeling dough with protective plastic covers, silicon parts A and B, silicon overflow rings, petroleum jelly, wooden mixing spatula and spoon, tooth brush, proper packaging materials and prepaid shipping label to return to dental laboratory/branded company or other service provider. As shown in the example embodiment, a denture duplication flask 302 can be a housing that is appropriately sized and shaped to hold a denture 304 within an interior compartment. In particular, flask 302 can be filled with a silicone molding material 306 before denture 304 is placed into the molding material, thereby generating an impression in the molding material. After an appropriate amount of time and proper placement in the molding material 306, denture 304 can be removed, leaving in its stead a negative void 402 as shown in diagram 400 of FIG. 4.

After a consumer has completed the in-home denture mold successfully, it can be returned to the dental laboratory/branded company/service provider utilizing a national postal service, drop-off at appropriate location, or other means. Upon receipt by the rigorous quality control inspection will be carried out by qualified dental technicians to ensure denture mold meets standards needed for successful denture duplication. If issues arise or are identified, consumers may be contacted by the laboratory and issued a new duplication kit and given extra guidance/assistance in the recreation of their denture mold. Once a high enough quality mold or otherwise satisfactory mold has been acquired, as a next step and as shown in diagram 500 of FIG. 5, an injectable duplication material 502 can be injected into negative void 402. To elaborate, a dental technician will inject a wax/resin material into the negative void created from the consumer's denture. This material will harden and will become an exact three-dimensional replica (a positive object created within and from the negative void) of the consumer's existing denture. Put another way, this injectable duplication material 502 can be a wax, resin, or other appropriate material or mix of materials that may take time to set. After the appropriate amount of time has passed and injectable duplication material 502 has set, an exact dimensional replica denture 602 of the original, existing denture has been created in the form of the hardened wax, resin, or other material or mix of materials, as shown in diagram 600 of FIG. 6. As shown in diagram 700 of FIG. 7, a three-dimensional scanner 702 can be an integral component in systems used to duplicate dentures.

Figure 8:
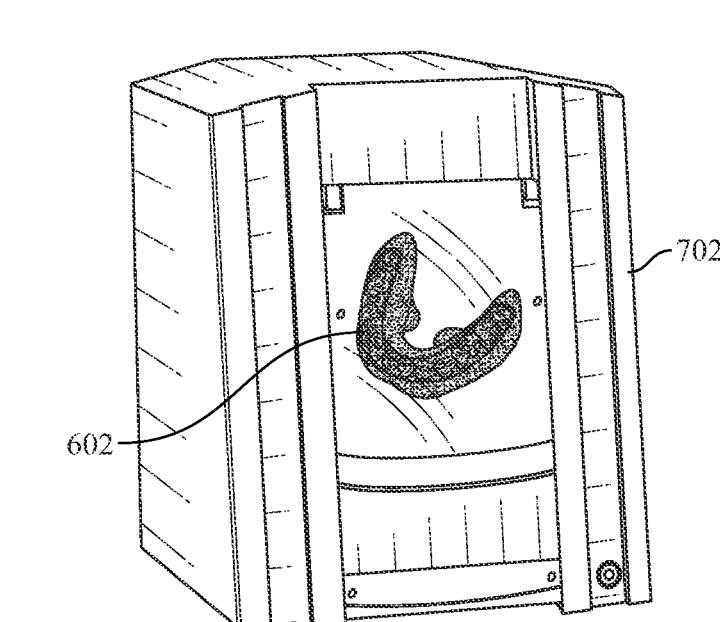
FIG. 8 shows a diagram of a replica being scanned by a three-dimensional scanner, in accordance with some embodiments described herein.
Figure 9:
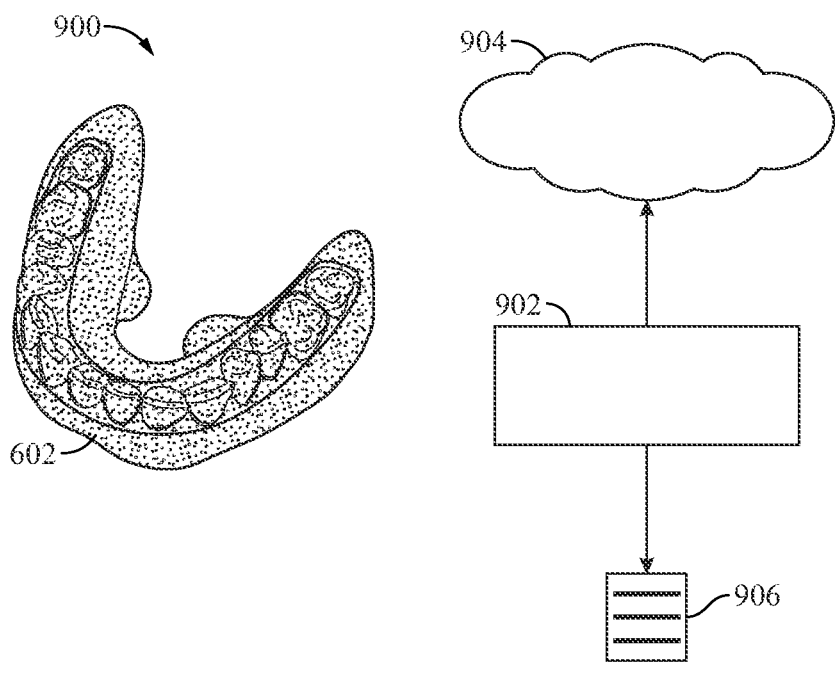
FIG. 9 shows a diagram of the results of scanning replica denture, whereby a denture specification file can be created and stored in a non-transitory computer readable medium, in accordance with sonic embodiments described herein.

As shown in diagram 800 of FIG. 8, replica denture 602 can be scanned using a three-dimensional scanner 702. As such, the replica denture will then be placed into a device, such as a five-axis three-dimensional scanner that is then scanned and saved as an STL file. FIG. 9 shows an example embodiment 900 of the results of scanning replica denture 602, whereby a denture specification file 902 (e.g. a STL file) can be created and saved in non-transitory, computer readable media, either in cloud storage 904, in local storage 906, or in both. Cloud storage 904 and/or local storage 906 may be accessible via a communicatively coupled network.

Figure 10:
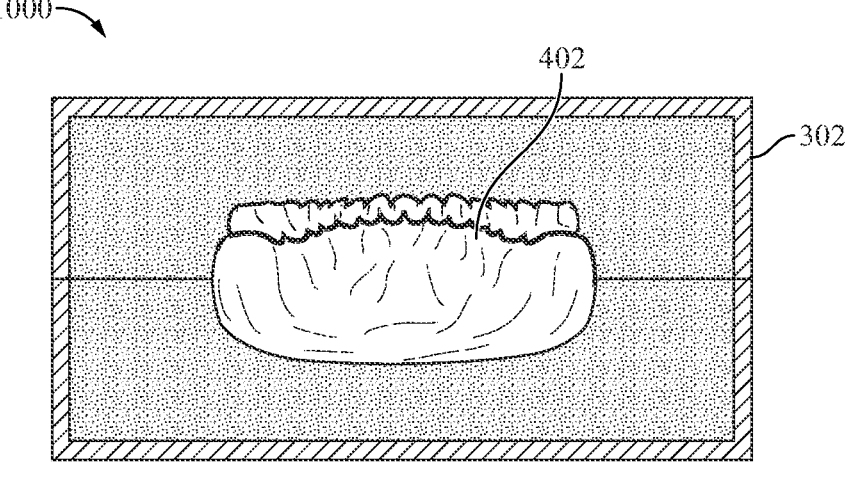
FIG. 10 shows a diagram depicting how a flask can be archived in physical storage for the purpose of being an analog backup to the digital denture specification file, in accordance with some embodiments described herein.

FIG. 10 shows an example embodiment diagram 1000, depicting how flask 302 can be archived in physical storage for the purpose of being an analog backup to the digital denture specification file 902. As such, the object or replica denture will then be returned to the denture mold and the mold will be stored in a secured facility for as long as the consumer's account is in good standing. Additionally, the STL file will be locally stored on a hard drive device as well as off-site cloud-based storage.

Figure 11:
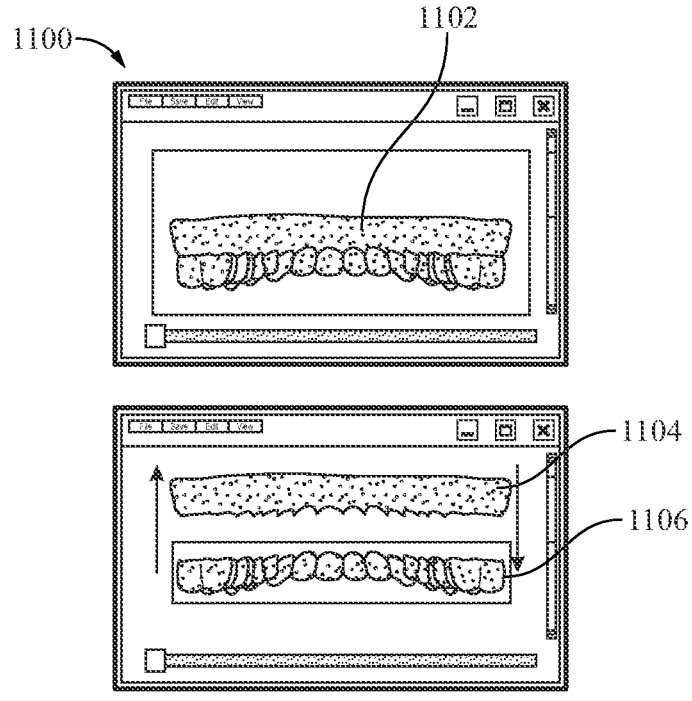
FIG. 11 shows a diagram of a user interface display showing a visual depiction of data stored in a denture specification file, in accordance with some embodiments described herein.

FIG. 11 shows an example embodiment diagram 1100 of a user interface display showing a visual depiction of data stored in a demure specification file. As shown in the example embodiment, a visual depiction 1102 of a duplicate denture mold specification file (e.g. a stored STL file) that has been loaded into a software program (e.g. CAD/CAM copy milling design. software) can be displayed via a user interface (e.g. a screen on a tablet, smartphone, display, monitor, television, or other visual display apparatus), wherein tools in the software can be used to manipulate the view and perform other functions with relation to certain portions of the duplicate denture mold. In typical embodiments, this can include digitally sectioning denture teeth 1106 from a denture platform 1104 or base. This functionality is useful in that it allows for the software to isolate a denture platform for printing via a three-dimensional printer and teeth can be separately, milled and affixed to the physical, printed denture platform. It should be understood by those in the art that the user interface display is communicatively and operably coupled to one or more controllers having one or more processors that are communicatively an operably coupled to user interaction controls (e.g. a keyboard, mouse, touchscreen, controller, buttons, or others), non-transitory computer readable media (e.g. memory), a wireless or wired network (e.g. a via a network card, router, etc.), and a power source.

Figure 12:
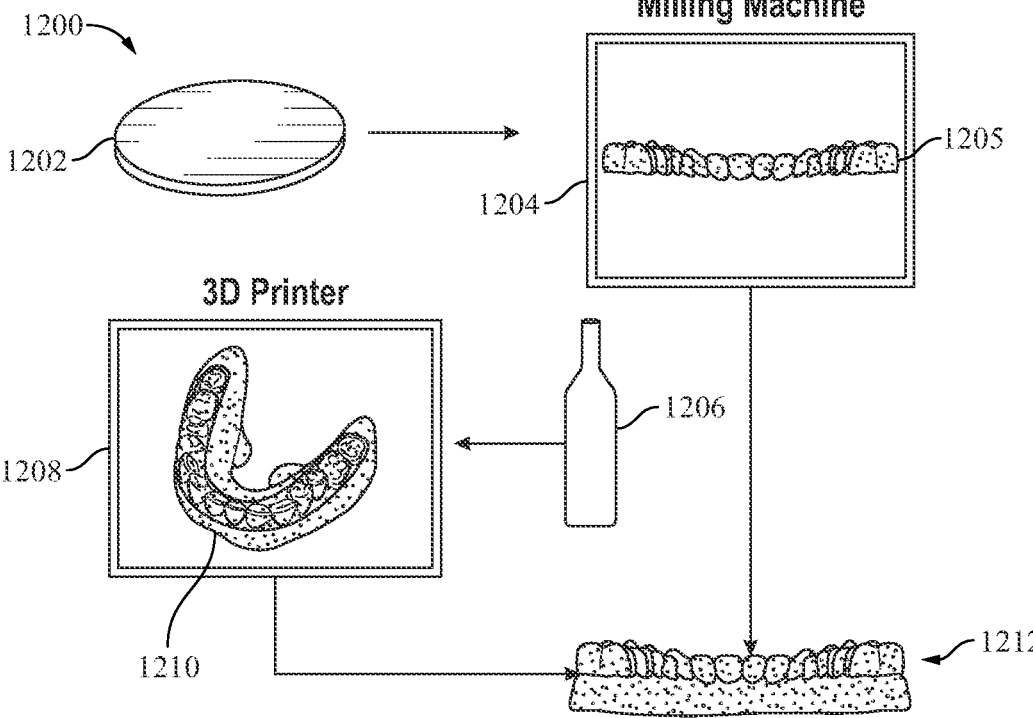
FIG. 12 shows a diagram of a manufacturing process for a duplicate denture, in accordance with some embodiments described herein.

FIG. 12 shows an example embodiment diagram 1200 of a manufacturing process for a duplicate denture. Once a software program (e.g. CAD/CAM copy milling design software) has isolated or otherwise generated a denture platform portion of a denture for printing and denture teeth for milling, they can be physically created and combined. As shown in the example embodiment, one or more denture teeth minable puck(s) 1202 can be introduced to a milling machine 1204, whereby denture teeth 1205 are milled and shaped into teeth matching the shape and contours of denture teeth from an existing denture. Contemporaneously, a denture base printable resin 1206 can be introduced into a three-dimensional printer 1208 in appropriate fashion as known in the art. The three-dimensional printer 1208 can then print a duplicate denture platform 1210 according to the specifications from CAD/CAM copy milling design software (e.g. via the process described with respect to FIG. 11).

Once printed, denture platform 1210 can be affixed to denture teeth 1205 using a dental or other appropriate adhesive to form a completed duplicate denture 1212. In other words, in a time of need, the consumer will contact laboratory/branded company/service provider and request a duplicate denture be made. At such time, STL file will be retrieved and imported into copy milling cad-cam design software. Once the file has been imported, design software will allow for virtual denture base and teeth separation. Once separated, the denture base cad-cam design will be exported to a three-dimensional printer for denture base printing utilizing quality printable denture base resins in the shade/ color chosen by the consumer at the beginning of (or at another time during) the process. Likewise, the denture teeth design will be exported and sent to a milling machine where the denture teeth will be milled from a quality millable tooth material consistent with shades/colors selected by the consumer at the beginning of (or at another time during) the process. After the denture base and teeth have been fabricated, a dental adhesive can be utilized to permanently bond denture teeth to the denture base. A qualified dental technician may then inspect the denture to ensure an exact replica/ duplicate denture is achieved. Original denture molds can be utilized during this step where they can be used to easily identify whether any variances exist between the actual identical mold of the original denture and the new denture.

In some embodiments, after quality control has been conducted, the duplicate denture can then be mailed to the consumer encapsulated in the denture mold that the user initially created. This can serve two purposes. First, it can help to protect the new, duplicate denture during shipping. Second, it can confirm the exact fit of the new denture to the mold that the consumer provided to the laboratory/branded company/service provider.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. One or more processes and/or steps thereof, may be combined, recombined, rearranged, omitted, or executed in parallel to create different process flows that are within the contemplated scope of the technology disclosed herein. While the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 4:
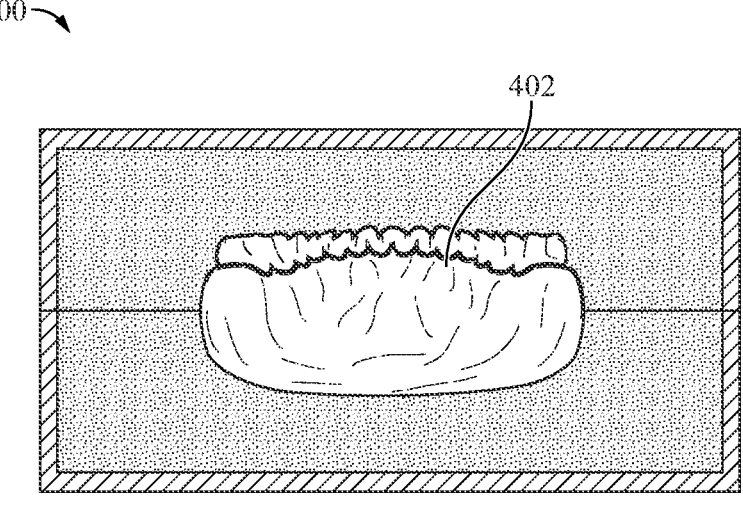
FIG. 4 shows a diagram of a negative void in a denture molding apparatus, in accordance with some embodiments described herein.
Figure 5:
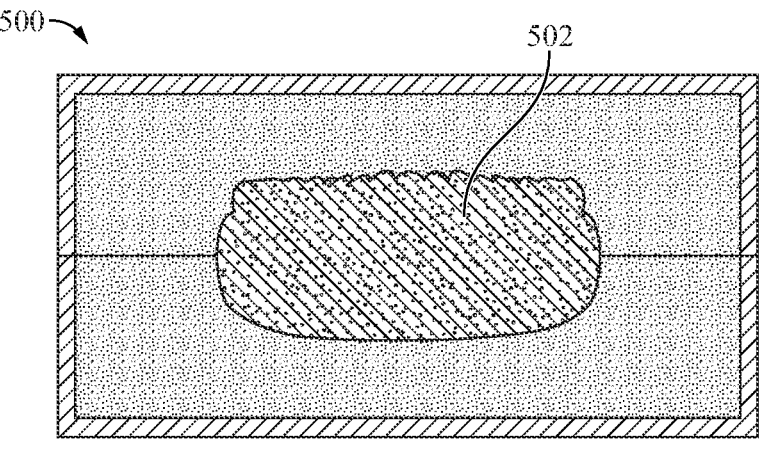
FIG. 5 shows a diagram of an injectable duplication material injected into a negative void, in accordance with some embodiments described herein.
Figure 6:
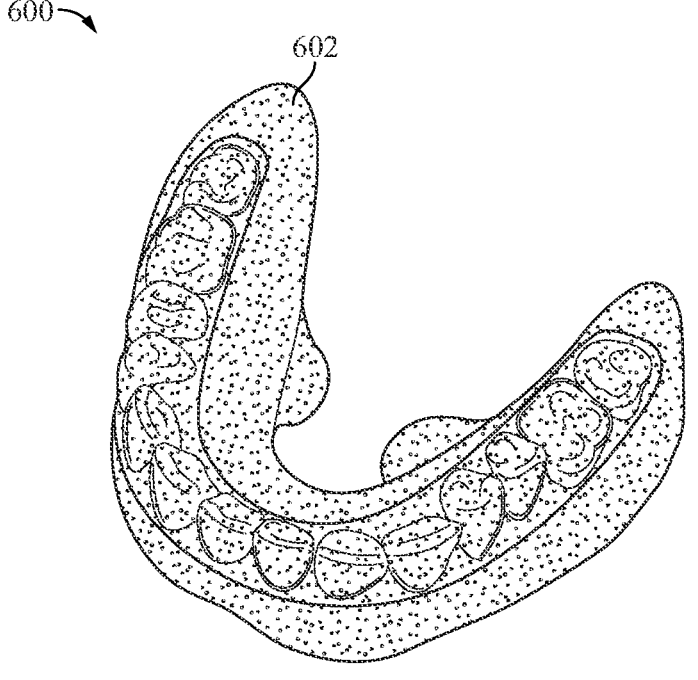
FIG. 6 shows a diagram of an exact dimensional replica denture of the original, existing denture, in accordance with some embodiments described herein.
Figure 7:
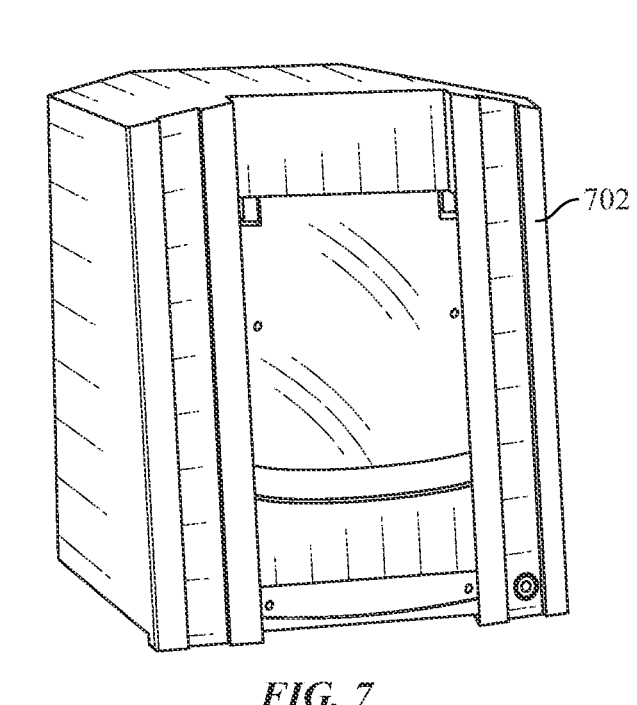
FIG. 7 shows a diagram of a three-dimensional scanner that can be an integral component in systems used to duplicate dentures, in accordance with some embodiments described herein.
Figure 13:
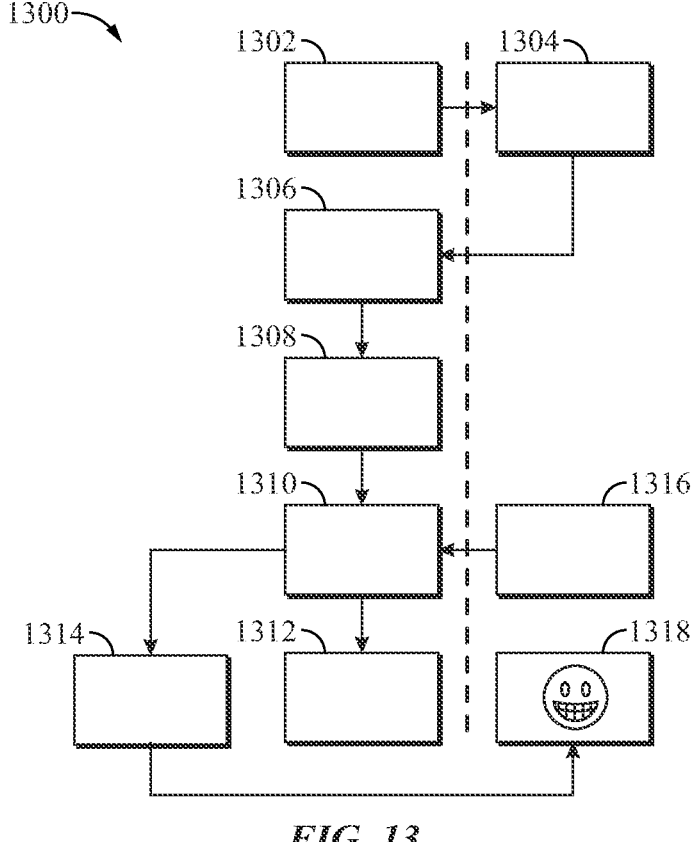
FIG. 13 shows a flowchart of a denture duplication process, in accordance with some embodiments described herein.

FIG. 13 shows an example embodiment flowchart 1300 of a denture duplication process. The left side of flowchart 1300 is the service provider side, while the right side is the patient/denture wearer side. As shown in the example embodiment, an initial step 1302 may include a service provider may provide a dental duplication kit for purchase (e.g. through a subscription model or otherwise) to a consumer (e.g. a denture wearer). The consumer may receive or otherwise procure the denture kit and perform physical steps to create a cast or mold of an existing denture for the wearer (or someone else, as appropriate) in the form of a negative void in step 1304. This can include inserting an existing denture into a silicone molding housed or otherwise contained inside a denture duplication flask (e.g. as shown in FIGS. 3, 4 for a period of time to create a negative void. In step 1306, the service provider may receive the cast or mold from the consumer (e.g. in the mail or by other delivery) with the negative void matching the contours and shape of the existing denture's physical features or topography. In step 1308, the service provide may create a duplicate denture by injecting a duplication material (e.g. a wax, resin, or other suitable material) into the negative void (e.g. as shown in FIG. 5). Once cured or set for an appropriate, predetermined amount of time, an exact dimensional replica denture of the existing denture has been created (e.g. as shown in FIG. 6). Next, in step 1310, a three-dimensional scanner (e.g. a five-axis three-dimensional scanner) as is known in the art or later developed can be used to digitally map the surface of the exact replica denture and a file can be created and saved in non-transitory, computer readable medium (e.g. computer memory), remotely in the cloud via a communicatively coupled wired or wireless network, locally, or both locally and remotely (e.g. as shown in FIGS. 7, 8, 9). Next, in step 1312, the denture duplication flask, exact replica denture (e.g. replacement denture), or both can be physically stored by the service provider in a repository (e.g. as shown in FIG. 10). Upon receipt of a request from the consumer in step 1316, the service provider can perform a step 1314, in which it load the stored file into CAD/CAM copy milling software, wherein the software can perform functions such as digitally separating, partitioning, or otherwise demarcating a denture platform or base from denture teeth in the stored file (e.g. as shown in FIG. 11). Once complete, the teeth portion can be transmitted to or otherwise used in a milling machine to manufacture teeth and the denture platform portion can be transmitted to or otherwise uploaded and used by a three-dimensional printing machine to manufacture a denture platform or base and the denture platform and teeth can be adhered together (e.g. as shown in FIG. 12) before being sent to the denture wearer. In various embodiments, the combined teeth and denture platform can then be sent to or otherwise given to the consumer in step 1318 who can happily enjoy their duplicate, replacement denture, which may have otherwise taken many weeks, exorbitant costs, and much heartache to acquire.

Figure 14:
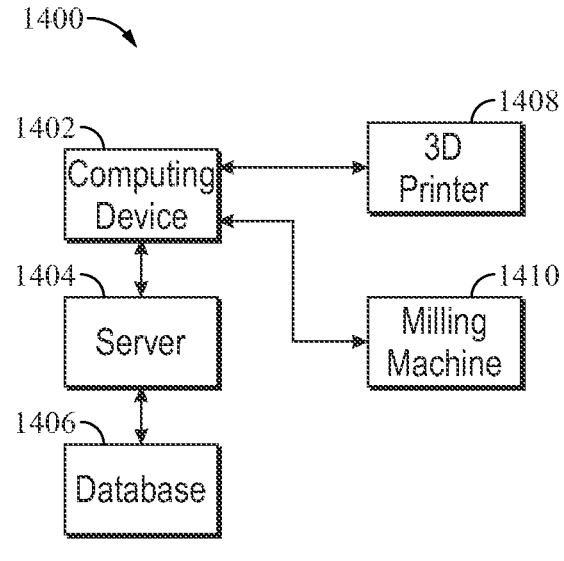
FIG. 14 shows a service provider system diagram, in accordance with some embodiments described herein.

As shown in FIG. 14, in various embodiments a service provider system diagram 1400 can include a computing device 1402 that is communicatively coupled via a wired and/or wireless network to a server 1404 that can include an accessible database 1406. Computing device 1402 can also be communicatively coupled to a three-dimensional printer 1408. Computing device 1402 can also be communicatively coupled to a milling machine 1410.

In various embodiments, the computing device 1402 can be a user device such as a smartphone, tablet computer, smart glasses, smartwatch, videogame console, PDA, laptop computer, desktop computer, dedicated device, or any other type of computing device. Generally, computing device 1402 can include communicatively coupled and operable memory such as non-transitory computer readable media, display(s), indicator(s) that can be separate from the display, power module(s), at least one processor and/or controller, user interface component(s) (e.g. touchscreen, mouse, keyboard, keypad, or others), audio component(s) (e.g. speakers, microphones, and/or other transceivers), camera and/or video component(s), networking component(s), operating system(s), and/or other component(s), module(s), and attachment(s) as appropriate and connected to be functional and operable for the purposes described herein as understood by those skilled in the art. Server 1404 can include a system of hardware and/or software that provides a network service in a computer network. Database 1406 can include a collection of organized data stored in non-transitory computer readable media or memory and in some embodiments can be located on server 1404, while in other embodiments database 1406 can be located on additional server(s) (not pictured) that are accessible by or via server 1404. 3D printer 1408 can be a three-dimension& printer as known in the art or later developed that is operable to print three dimensional items (e.g. at least denture platforms), can include operable networking components and power components, at least one processor, non-transitory computer readable media or memory, electromechanical devices required for printing, and can include at least one status indicator. Milling machine 1410 can be a milling machine as known in the art or later developed that is operable to print three dimensional items (e.g. at least denture platforms), can include operable networking components and power components, at least one processor, non-transitory computer readable media or memory, electromechanical devices required for milling and can include at least one status indicator.

In some instances, denture wearers may agree to one of any number of payment or subscription programs. One such program can include an annual premium for on-demand dental duplication services, such as by paying the first six months up-front and monthly billing beginning for months thereafter. Up-front charges can be used to cover costs for denture duplication kits, storage, maintenance, and other expenses. In various embodiments, annual renewals may be billed in weekly, biweekly, monthly, quarterly, semiannually, or in other installments. In some embodiments, if, at any time after a specific period (e.g. a thirty-six month period), a denture wearer should lose their denture and need it replaced, a zero-cost duplicate denture that is an exact replica of the wearer's denture can be fabricated by a dental laboratory with proper certification and delivered to the wearer within a short period, e.g. two or three business days. In some instances, if a denture wearer should need a replacement denture prior to thirty-six months, the as-yet unpaid monthly premiums (up to thirty-six months) may be required at the time the service is needed and prior to replacement denture fabrication. Subscribers to dental duplication/replacement/replication services described herein may be issued a new denture duplication kit from time to time, e.g. every thirty-six months. This process can be used to ensure that archived denture molds and STL files remain consistent with the subscriber's existing dentures and to address the issues of normal wear and oral changes that can occur over time. In the event that subscribers remain in good standing by paying their monthly premiums and performing any other required tasks as defined by their contracts, their zero additional cost duplicate denture can be available on demand.

In some instances, upon signing up for a denture duplication/replacement/replication service and delivery of a first 6-month premium payment, a denture wearer or their surrogate or caretaker may receive a kit, package, or box containing everything needed to make an in-home denture mold of the denture(s) they wish to protect.

In various embodiments, functionality may not be held strictly to the use of a protective "duplicate denture on demand" feature. Additionally, consumers wishing to keep their "exact smile" for life can benefit from the invention. It can be common for denture wearers to replace their dentures every 10 to 12 years due to denture aging, and changes to oral anatomy. Many denture wearers experience dissatisfaction with the aesthetic results of their smile after new dentures are fabricated. It is rare that new dentures look the same as those that are being replaced. Having a "duplicate denture on demand" allows for a consumer to maintain their "exact smile" for life and to make their dentures new again whenever they feel the need or desire. In order to maintain an ideal fit, consumers may opt to revisit a dentist occasionally to have a reline of their denture completed. A reline is an addition of acrylic to the tissue side of one's denture. This addition is sometimes necessary to improve fit if changes have occurred to oral anatomy i.e. severe weight loss, atrophy, etc. Even if such reline is needed, no other aesthetic or dimensional changes will ever occur since an "exact replica duplicate denture" will always be available.

An alternative method to the above description of invention may be one of directly using a 3D scanner to scan existing dentures. This may be applicable in situations where group protection of multiple consumers is needed. In some example embodiments, nursing homes may desire that residents' dentures be digitally archived to provide duplicate denture fabrication if needed. In such instances, a dental laboratory/branded company representative may conduct an onsite visit where dentures are scanned directly using a portable scanner, bypassing the need for the analog denture duplication kit as previously described.

As used herein and in the appended claims, the singular forms "a", "an", and "the" include plural referents unless the context clearly dictates otherwise.

The publications discussed herein are provided solely for their disclosure prior to the filing, date of the present application. Nothing herein is to be construed as an admission that the present disclosure is not entitled to antedate such publication by virtue of prior disclosure. Further, the dates of publication provided may be different from the actual publication dates which may need to be independently confirmed.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A denture duplicating method without requiring a clinical fitting appointment by a dentist, comprising:
   providing a mold-forming kit to a wearer;
   forming a mold of a denture with the mold-forming kit;
   receiving the mold of the denture from the wearer;
   scanning a mold of the denture for the wearer using a scanner coupled to a controller;
   generating, by the controller, a denture specifications file based on a scan of the mold of the denture;
   storing, by the controller, the denture specifications file in non-transitory computer readable memory wherein the mold is formed as a negative impression of the wearer's original denture and retains anatomical details of the original denture;
   in response to receiving a computer-based request from a user, automatically retrieving, by the controller, the denture specifications file and loading, by the controller, the denture specifications file into a milling design application executed by the controller to generate a replacement denture platform design;

in response to receiving an electronic payment from the user, automatically instructing, by the controller, a communicatively coupled three-dimensional printer to perform a print operation; and
   in response to the instructing, automatically printing the replacement denture platform based on the replacement denture platform design, wherein the replacement denture platform can then be sent to the wearer; and
   providing the replacement denture platform to the wearer.

2. The denture duplicating method of claim 1, wherein the mold of the denture is a three-dimensional replica of the wearer's original denture.

3. The denture duplicating method of claim 2, wherein the mold is created by injecting a substance into a hollow space matching the wearer's original denture.

4. The denture duplicating method of claim 1, wherein the denture specifications file further comprises:
   data relating to surface geometry of the scanned mold of the denture comprising curvature, depth profiles, and undercut locations of the original denture's surfaces.

5. The denture duplicating method of claim 4, wherein the denture specifications file further comprises:
   a STL file usable in a stereolithographic CAD program to generate a printable 3D model of the replacement denture platform.

6. The denture duplicating method of claim 1, wherein the replacement denture platform has a coloring that is customizable.

7. The denture duplicating method of claim 1, wherein the replacement denture platform is coupled with milled teeth prior to being sent to the wearer that are manufactured based on tooth positioning extracted from the original denture mold.

8. The denture duplicating method of claim 1, wherein the scanner further comprises:
   a multiple-axis three-dimensional scanner.

* * * * *